United States Patent
Arrasvuori (10) Patent No.: US 9,930,128 B2
(45) Date of Patent: Mar. 27, 2018

(54) METHOD AND APPARATUS FOR ACCESSING A VIRTUAL OBJECT

(75) Inventor: Juha Henrik Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 9 days.

(21) Appl. No.: 13/251,173

(22) Filed: Sep. 30, 2011

(65) Prior Publication Data

US 2013/0083005 A1 Apr. 4, 2013

(51) Int. Cl.
*H04L 29/08* (2006.01)
*H04L 29/06* (2006.01)

(52) U.S. Cl.
CPC .............. *H04L 67/18* (2013.01); *H04L 67/38* (2013.01)

(58) Field of Classification Search
CPC ......... G06T 15/00; G06F 3/048; G06F 21/00; H04L 29/06; H04L 29/08; H04L 67/18; H04L 67/38; H04N 7/173; A01B 12/006; G09G 5/00
USPC .......... 345/419, 156, 633, 173, 676, 650, 6; 715/863, 849, 757, 862; 455/70, 420; 725/133
See application file for complete search history.

(56) References Cited

U.S. PATENT DOCUMENTS

| | | | |
|---|---|---|---|
| 5,682,196 A | 10/1997 | Freeman | |
| 9,361,729 B2 * | 6/2016 | Narayanan | ............ G06T 19/006 |
| 2003/0222907 A1 * | 12/2003 | Heikes | ............ G06Q 10/107 |
| | | | 715/745 |
| 2006/0085419 A1 * | 4/2006 | Rosen | ............ G06F 17/3087 |
| 2007/0043748 A1 * | 2/2007 | Bhalotia | ............ G06F 17/30265 |
| 2007/0124503 A1 * | 5/2007 | Ramos | ............ G06F 3/017 |
| | | | 709/248 |
| 2008/0122871 A1 * | 5/2008 | Guday | ............ G06F 21/6218 |
| | | | 345/634 |
| 2009/0017799 A1 * | 1/2009 | Thorn | ............ G06F 3/017 |
| | | | 455/414.1 |
| 2009/0081959 A1 * | 3/2009 | Gyorfi | ............ H04W 4/02 |
| | | | 455/70 |
| 2009/0237328 A1 * | 9/2009 | Gyorfi | ............ G06F 3/011 |
| | | | 345/9 |
| 2010/0306825 A1 | 12/2010 | Spivack | |
| 2011/0163944 A1 * | 7/2011 | Bilbrey | ............ G01D 21/02 |
| | | | 345/156 |

(Continued)

FOREIGN PATENT DOCUMENTS

| | | |
|---|---|---|
| CN | 101465957 A | 6/2009 |
| WO | 2001/088687 A2 | 11/2001 |
| WO | 2008/132724 A1 | 11/2008 |

OTHER PUBLICATIONS

International Search Report and Written Opinion received for corresponding Patent Cooperation Treaty Application No. PCT/FI2012/050928, dated Dec. 14, 2012, 12 pages.

(Continued)

*Primary Examiner* — Gregory J Tryder
*Assistant Examiner* — Michael Le
(74) *Attorney, Agent, or Firm* — Alston & Bird LLP (57) ABSTRACT

An approach is introduced for providing, by an apparatus, a virtual object that represents an item. The virtual object is perceivable to a user by at least one of the following ways: audibly, visibly or by haptic feedback. The item may be accessed by another apparatus when the position of the other apparatus corresponds to a perceived position of the virtual object. Once the item has been accessed, it can be copied and edited by the other apparatus.

20 Claims, 6 Drawing Sheets

(56) References Cited

U.S. PATENT DOCUMENTS

| | | | |
|---|---|---|---|
| 2011/0227871 A1* | 9/2011 | Cannon | 345/174 |
| 2012/0050324 A1* | 3/2012 | Jeong | G06F 17/30 |
| | | | 345/633 |
| 2012/0092373 A1* | 4/2012 | Ryu | G06T 19/006 |
| | | | 345/633 |
| 2012/0105474 A1* | 5/2012 | Cudalbu | H04W 4/02 |
| | | | 345/633 |

OTHER PUBLICATIONS

Office Action from corresponding European Patent Application No. 12783636.9 dated Dec. 5, 2016.

\* cited by examiner

METHOD AND APPARATUS FOR ACCESSING A VIRTUAL OBJECT

TECHNICAL FIELD

The present application relates generally to virtual objects. The present application relates in an example, but not exclusively, to providing a virtual object and to accessing a virtual object.

BACKGROUND

Apparatuses are able to connect with each other and can share data items. Information can be shared, provided or received between apparatuses. Apparatuses can also make items perceivable to a user.

SUMMARY

Various aspects of examples of the invention are set out in the claims.

According to a first example of the present invention there is provided an apparatus comprising at least one processor and at least one memory including computer program code, the at least one memory and the computer program code configured to, with the at least one processor, cause the apparatus at least to provide a virtual object that has position perceivable to a user, determine a proximity of another apparatus and when the determined proximity corresponds to the position perceivable to the user, make the virtual object accessible to the other apparatus.

According to a second example of the present invention there is provided a method comprising providing a virtual object that has a position perceivable to a user determining a proximity of another apparatus and when the determined proximity corresponds to the position perceivable to the user, making the virtual object accessible to the other apparatus.

According to a third example of the present invention there is provided an apparatus comprising at least one processor and at least one memory including computer program code, the at least one memory and the computer program code configured to, with the at least one processor, cause the apparatus at least to access a virtual object provided by another apparatus when a position of the apparatus corresponds to a position, perceivable to a user, of the virtual object provided by the said other apparatus.

According to a fourth example of the present invention, there is provided a method comprising accessing a virtual object provided by an apparatus when the position corresponds to the position, perceivable to a user, of the virtual object provided by the said other apparatus.

According to a fifth example of the present invention, there is provided a computer program product comprising a computer-readable medium bearing computer program code embodied therein for use with a computer, the computer program code comprising code for providing a virtual object that has position perceivable to a user; code for determining a proximity of another apparatus and, when the determined proximity corresponds to the position perceivable to the user, code for making the virtual object accessible to the other apparatus.

According to an sixth example of the present invention, there is provided a computer product comprising a computer-readable medium bearing computer program code embodied therein for use with a computer, the computer program code comprising code for accessing a virtual object provided by another apparatus when the position of the apparatus corresponds to the position, perceivable to a user, of the virtual object provided by the said other apparatus.

According to a seventh example of the present invention, there is provided an apparatus comprising means for providing a virtual object representing an item, the virtual object having a position perceivable to a user means for detecting a proximity of another apparatus; and when the detected proximity corresponds to the position perceivable to the user, means for making the item accessible to the other apparatus.

According to a eighth example of the present invention, there is provided an apparatus comprising means for accessing an item represented by a virtual object provided by another apparatus when a position of the apparatus corresponds to a position, that is perceivable to a user, of the virtual object provided by the said other apparatus.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

The aspects of the disclosed embodiments generally provide techniques for accessing a virtual object. The virtual object may be an object provided by an apparatus that is perceivable to a user.

Some exemplary embodiments relate to accessing the virtual object using another apparatus. In some examples the virtual object may be viewed by the other apparatus. Further in some embodiments, the virtual object may copied to the other apparatus and after that returned to the apparatus from which it was copied.

Figure 1:
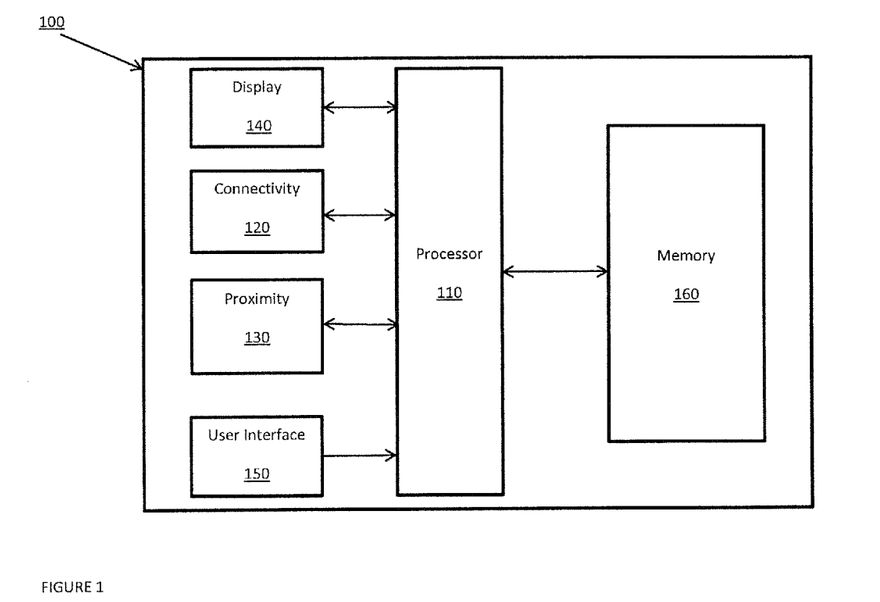
FIG. 1 shows a block diagram of an example apparatus in which aspects of the disclosed embodiments may be applied.

FIG. 1 is a block diagram depicting an apparatus 100 suitable for operating in accordance with an example embodiment of the invention. Generally, the apparatus 100 includes a processor 110, a memory 160 and a user interface 150. However, it should be noted that the apparatus may have an external user interface as well, in which case the processor and the memory may reside in a first apparatus that is then connected to the user interface. The connection may be done using any means available for connecting apparatuses.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In some example embodiments, the processor 110 is configured to execute instructions stored in the memory 112 or otherwise accessible to the processor 110. These instructions, when executed by the processor 110, may cause the apparatus 100 to perform one or more of the functionalities of the apparatus 100 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 160 may comprise, for example, volatile memory, non-volatile memory, or some combination thereof. In this regard, the memory 160 may comprise a non-transitory computer-readable storage medium. Although illustrated in FIG. 1 as a single memory, the memory 160 may comprise a plurality of memories. The plurality of memories may be embodied on a single computing device or may be distributed across a plurality of computing devices collectively configured to function as the apparatus 100. In various example embodiments, the memory 160 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 160 may be configured to store information, data, applications, instructions, or the like for enabling the apparatus 100 to carry out various functions in accordance with various example embodiments. For example, in some example embodiments, the memory 160 is configured to buffer input data for processing by the processor 110. Additionally or alternatively, the memory 160 may be configured to store program instructions for execution by the processor 110. The memory 160 may store information in the form of static and/or dynamic information. The stored information may include, for example, images, content, media content, user data, application data, and/or the like.

In an example embodiment, the user interface 150 comprises an input device for inputting signals that can be interpreted by the processor as commands to be executed. As an example, a means for inputting characters may be a manually operable control such as a button, a key, a touch screen, a touch pad, a joystick, a stylus, a pen, a roller, a rocker or similar. Further examples are a microphone, a speech recognition system, an eye movement recognition system, acceleration, tilt and/or movement based input systems, or a remote control that sends signals via wireless radio connection.

In an example embodiment the apparatus 100 includes an output device such as a loudspeaker for presenting audio information for a user. The loudspeaker may be configured to receive control signals provided by the processor 110. The loudspeaker may be configured to audibly present the received control signals. However, it is also possible that the apparatus does not include a loudspeaker or the loudspeaker is an external loudspeaker, separate from the apparatus itself.

In a further example embodiment the apparatus 100 includes an output device such as a haptic feedback system for presenting haptic information for a user. The haptic feedback system may be configured to receive control signals provided by the processor 110. The haptic feedback system may be configured to provide haptic feedback to the user for example by vibrating the apparatus 100 or providing feelable bumps in the user interface area.

Further, according to one embodiment illustrated in FIG. 1, the output device is a display 140 for presenting visual information to a user. The display 140 is configured to receive control signals provided by the processor 110. The display may be configured to present a virtual object. The display may be a two-dimensional display. The display may also be capable of providing a 3D (three dimensional) perception to a user. However, it is also possible that the apparatus does not include a display or the display is an external display, separate from the apparatus itself.

In general, 3D techniques allow a user to perceive depth in a two dimensional user interface by presenting a different image to each eye of the user. Because the eyes are apart, each eye sees the same thing from a different perspective. These two images are then combined by the brain. In 3D technologies, by providing a different image for each eye, the combination of those images causes the user to perceive a 3D image. A variety of techniques exist to enable a different image to be perceived by the left and the right eye. Some of those techniques involve glasses that the user wears while watching. Those glasses have different lenses for each eye. The lenses may vary in the way they filter the information in the perceived image. For example, half of the information goes to left and half to the right image. This can be done for example by red-blue, red-green or magenta-cyan filtering. In another example, the lenses may use polarization in filtering the image. Alternatively, there may be media displayed at a high frame rate and then the glasses rapidly switch between black and clear. This way only one eye at a time perceives the displayed media. In addition to glasses based techniques, techniques exist for providing 3D perception without the user needing to wear glasses. For example, autostereoscopic displays provide the user with 3D perception without the user needing glasses. Autostereoscopic displays generally use a method for having a pixel or a group of pixels that have their light directed to one eye and then having another pixel or a group of pixels that have their light directed to the other eye.

In the example embodiment shown in FIG. 1 the apparatus further has a connectivity unit 120 that enables communication sessions to be established with another apparatus. The connectivity unit 120 enables connectivity to one or more networks such as a data network, a wireless network, a telephony network, or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), personal area network (PAN) (e.g., a Bluetooth® PAN), and the like.

The exemplary apparatus 100 further comprises a proximity unit 130 configured to detect the proximity the apparatus 100 has with relation to another object. It may for example combine ultrasonic and inertial positioning sensors to detect changes in movement, position, orientation or presence of other apparatuses.

Other embodiments may have additional and/or different components.

In general, the apparatus 100 may be any type of mobile terminal, fixed terminal, or portable terminal including a mobile handset, station, unit, device, multimedia computer, multimedia tablet, Internet node, communicator, desktop computer, laptop computer, a tablet device, Personal Digital Assistants (PDAs), or any combination thereof. Moreover, the apparatus 100 may execute one or more software applications or utilities, including but not limited to those for enabling or facilitating network access and communication, internet browsing, social networking, e-mail communication, file sharing and data transfer, word processing, data entry, spreadsheet processing, mathematical computation, etc. These applications and utilities may also be interoperable, so as to enable the execution of various features of the aforementioned application and utilities to be simultaneously executed to enable specific user tasks. Data generated by or exchanged by other apparatuses can be stored to the memory 160.

Computer program instructions for enabling implementation of example embodiments of the invention, or a part of such computer program instructions, may be downloaded from a data storage unit to the apparatus 100, by the manufacturer of the electronic device, by a user of the electronic device, or by the electronic device itself based on a download program, or the instructions can be pushed to the electronic device by an external device. The computer program instructions may arrive at the electronic device via an electromagnetic carrier signal or be copied from a physical entity such as a computer program product, a memory device or a record medium such as a CD-ROM or DVD.

Figure 2A:
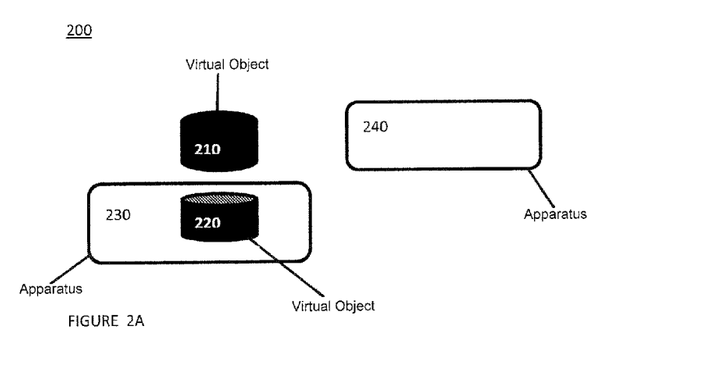
FIGS. 2A to 2E illustrate exemplary embodiments incorporating aspects of the disclosed embodiments.

In FIG. 2A a virtual object 210 is illustrated. The virtual object 210 is a representation of an item that is in a digital format and can be saved to the memory 160 or the like. The virtual object 210 may also represent an item obtained via a network such as the World Wide Web. The item could be for example a data file such as a photo, a music file, a video file, an animation file, a hyperlink, a text file or the like. The item may also contain computer program instructions that when loaded to a processor control an operation to be performed in an apparatus. The virtual object 210 in an example embodiment is displayed to the user using a display 140. In an example embodiment the display is an autostereoscopic display. Thus the virtual object may be perceivable as a 3D object for example in front of the apparatus, behind the apparatus or anywhere else outside of the apparatus. Other virtual objects 220 may be displayed along with the virtual object 210 by the display 140. Like the virtual object 210, the virtual object 220 is a representation of an item that is in a digital format and may be saved to the memory 160 or the like and/or it may be obtained via a network or other connection. The virtual object 220 may also represent for example a data file such as a photo, a music file, a video file, an animation file, a hyperlink, a text file or the like. The virtual objects 210 and 220 may be perceived as being at different discrete altitudes relative to an apparatus 230. These altitudes, hereafter referred to as virtual layers, have a corresponding altitude in a physical environment. Alternatively the virtual objects 210 and 220 may be perceived without discrete height layers but instead within a continuous height range. In other words, the virtual objects may reside anywhere within a 3D projection range of the apparatus 230. It should be noted that in discussions of embodiments of the present invention, where the terms "height" or "altitude" are used, these terms are not intended to imply a strictly vertical distance, but may refer to any direction away from an apparatus presenting virtual objects.

Because 3D perception is based in the two eyes of a user perceiving the same image from different angles and the brain then combining two perceived images, different people may perceive the same height differently as the positions from which their eyes perceive the image vary from person to person. Thus perceived location may be the exact equivalent of the physical location to which the virtual object 210 or 220 is displayed, but it may also differ from the equivalent physical location. For example, a user may perceive the virtual object 210 or 220 at 5 inches above the display 140, though the actual physical distance from the display 140 to the displayed virtual object 210 or 220 is 5.5 inches. It should be noted that embodiments of the invention may utilise perceived locations or actual locations of virtual objects projected or presented by an apparatus, regardless of the manner in which a virtual object is presented or selected. In some situations greater useability may be achieved by utilising perceived locations (or estimated perceived locations) since this may permit customising an apparatus or an environment to a specific user's own perceptions. On the other hand, it may be preferable in some situations to utilise actual location, for example to provide improved consistency, either between different users or for the same user when in different positions or attitudes.

The virtual objects 210 and 220 illustrated in FIG. 2A may be static and maintain a constant physical location or they could be dynamic and change their location, for example continuously or after time-intervals. If the virtual objects 210 and 220 are displayed using discrete virtual layers, then the objects may vary their perceived locations either within one layer or from one layer to another. If the virtual objects 210 and 220 are displayed in a continuous height range, then the physical location may change to be anywhere within the 3D projection range of the apparatus 230. The virtual objects 210 and 220 may have any shape or size that can be perceived by a user. The virtual objects may also have any colour, they may have several colours, or they may be fully or partially transparent, for example with only the edges of the object detectable. The virtual objects 210 and 220 may also have a detectable shadow. Any of these properties of the virtual objects 210 and 220 may be configured to change, for example constantly or after time-intervals. The virtual objects 210 and 220 may also leave a detectable trail when they move from one perceivable position to another.

Virtual objects 210 and 220 may also have audio associated with them. The audio could be detectable when the virtual object 210 or 220 is displayed. The audio could also correlate to the physical location of the virtual object 210 or 220. For example, if the physical location of the virtual object 210 or 220 is next to the display 140, then the audio could be detectable as if it was coming from the physical location next to the display 140. Alternatively, the audio could be louder the closer the perceived location of the virtual object 210 or 220 is, or vice versa. Further, the virtual object 210 or 220 could be only detectable by audio. In such an embodiment, first, the user would be guided to move an apparatus 240 towards the direction where the audio is coming from. Then the audio would get louder as the virtual object 210 or 220 is approached, and would fade if the apparatus 140 is moved away from the virtual object. Once the virtual object 210 or 220 is reached by the apparatus 240, a different audio alert to indicate that could be used.

In an example embodiment, the virtual object 210 is perceived on one virtual layer corresponding to a plane in a physical environment and the virtual object 220 is perceived at another virtual layer corresponding to another plane in the physical environment. In the example embodiment, apparatus 230, being alike to the apparatus 100 of FIG. 1, is located on a table with the display 140 facing upwards and thus viewed downwards by the user. Alternatively, the apparatus 230 may be standing on a table, thus viewed forwards by the user. It should be noted that the apparatus 230 does not necessarily have to be similar to the apparatus 100 of the FIG. 1, but any suitable apparatus may be used. Another apparatus 240 is located nearby. The virtual objects 210 and 220 provided by the apparatus 230 are perceivable to a user of the apparatus 240.

According to an example embodiment, a text file is represented by a virtual object that has the shape of a rectangle. The appearance of the virtual object is white with black text, to imitate the appearance of the text file itself. The virtual object has a detectable shadow that is perceived as grey. The virtual object is perceived above a tablet device displaying the virtual object. The text file is saved in the memory of the tablet device.

Figure 2B:
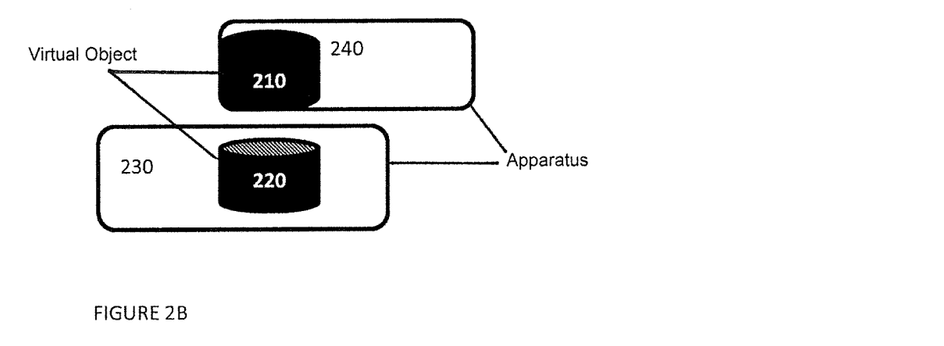

FIG. 2B illustrates a situation in which the apparatus 240 accesses the item represented by the virtual object 210 by being brought to the location corresponding to the perceived location of the virtual object 210. The apparatus 230 is aware of the perceived position of the virtual object 210. For exemplary purposes only, the perceived location, which in this example corresponds to the physical location, of the virtual object 210 is 5 inches above the apparatus 230. The apparatus 240 is aware of its proximity with relation to the apparatus 230. In examples of the invention, awareness of proximity may include one or more of awareness of the exact location of one or more apparatuses, awareness of the distance between apparatuses, or awareness of relative positions or attitudes of apparatuses, among other things. In one example awareness of proximity may be achieved in the manner described below.

In one embodiment, a proximity unit 130 of the apparatus 240 combines ultrasonic and inertial positioning sensors to detect changes in movement, position, orientation or presence of the apparatus 230. By way of example, the relative position of the apparatus 240 with respect to the apparatus 230 is measured using ultrasonic signals while inertial positioning sensors are used to detect shifts in movement from the position. The functionality of the proximity unit 130, while present on both of the apparatuses 230 and 240 in this example, will be described from the perspective of the apparatus 240. Further, while apparatuses 230 and 240 are depicted in FIG. 2B as being identical, it should be noted that this depiction is merely for the sake of simplicity, and the functionality of the proximity unit 130 as presented herein is applicable to any type of apparatus or form factor.

In the proximity unit 130 ultrasonic position detection starts with an infrared (IR) signal, which is sent uniformly to all directions. This signal serves as a starting point for calculating the ultrasound transmission delay. The IR-signal also has an identity (ID) code which identifies the transmitter, which is comprised within the proximity unit 130, and informs the apparatus 230 whether the transmitter apparatus 240 is stationary or moving. The time difference between the beginning of the IR-signal and the instant of reception by the proximity unit of the ultrasound burst is used to calculate the distance between the apparatuses 230 and 240.

In general, transmitted ultrasonic signals may be received by two or more microphones located in the proximity unit 130.

Alternatively, any suitable means for detecting the distance to another apparatus may be used.

FIG. 2B illustrates an example situation in which the apparatus 240 is to access the item represented by the virtual object 210. In the example shown in FIG. 2B the apparatuses communicate with each other using a wireless connection such as Bluetooth® or WLAN. Alternatively the apparatuses 230 and 240 may communicate via a server. In general, the communication occurs using well known, new or still developing protocols. In this context, a protocol includes a set of rules defining how network nodes within a communication network interact with each other based on information sent over communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

When communicating, the apparatus 240 sends information comprising its proximity to the apparatus 230. Alternatively, the apparatus 230 may detect the proximity of the apparatus 240. The detection may be using the proximity unit 130 of the apparatus 230, for example in the same way as was described previously. According to the example embodiment, the apparatus 230 is aware of the perceived location of the virtual objects 210 and 220.

As was mentioned above, the perceived location of the virtual object 210 does not necessarily correspond to the projected location of the virtual object 210 because different people perceive the projection differently. The apparatus 230 may become aware of the difference between the perceived location and the projected location by calibration. The calibration may be done for example by first projecting the virtual object 210. Then the user of the apparatus 240 positions the apparatus 240 at the perceived location of the virtual object 210. Once the apparatus 240 is at the perceived location of the virtual object 210, the apparatus 240 may communicate to the apparatus 230 that it is at the perceived location. This communication may be initiated by the user using the user interface 150. The apparatus 240 may now detect its proximity to the apparatus 230 and then communicate that to the apparatus 230 or the apparatus 230 may detect the proximity of the apparatus 240. As the proximity of the apparatus 240 to the apparatus 230 corresponds to the perceived location of the virtual object 210, the perceived location is known and the difference between the actual projected location of the virtual object 210 and the perceived location is known.

As the apparatus 230 is aware of the perceived location of the virtual object 210 and it either detects or receives the proximity of the apparatus 240, it may compare the proximity of the apparatus 240 and the perceived location of the virtual object 210. In the event that as a result of the comparison it is determined that the proximity corresponds to the perceived position of the virtual object 210, then the item represented by the virtual object 210 may be accessed by the apparatus 240. Alternatively, there may be a tolerance region around the virtual object 210 in which the item represented by the virtual object 210 is accessible as well. In other words, if the apparatus 240 is detected to be in the tolerance region, the item represented by the virtual object 210 is accessible. This tolerance region could be for example the area 1 inch around the perceived location of the virtual object 210. If the virtual object 210 has a different shape from the apparatus 240 (which will typically be the case), it is sufficient that some parts of the apparatus 240 and the virtual object 210 overlap or that some part of the apparatus 240 overlaps with at least a part of the tolerance region. In general the item represented by the virtual object 210 may become accessible when the apparatus 240 overlaps at least partly with either the perceived location of the virtual object or the tolerance region around the perceived location of the virtual object 210. If a virtual object has a shadow, then bringing an apparatus to the position of the shadow may enable access to the item represented by the virtual object or alternatively, it may not.

The item represented by the virtual object 210 may be accessible by any suitable apparatus or there may be restrictions to which apparatus may access it. It is possible to require for example the apparatus 240 to have a button pressed when it approaches the perceived location of the virtual object 210 to indicate that the apparatus 240 wishes to access the item represented by the virtual object 210. Alternatively there may be available a mode, or any other suitable means, which indicates the desire to access the item represented by the virtual object 210 in the apparatus 240. As described further below, there may be for example a password required once the apparatus 240 is brought to a location from which it may access the item represented by the virtual object 210. If the password is correct, then the item represented by the virtual object 210 is made accessible by the apparatus 230 and if not, then access to the item represented by the virtual object 210 is denied. Alternatively, there could be a predefined list of apparatuses in the apparatus 230 that are allowed to access the item represented by the virtual object 210. The predefined list could be based on a unique ID that each apparatus may have. This ID may be for example the unique ID that the apparatus has been given by the manufacturer or it could be a Bluetooth ID or any other means for identifying the apparatus. If the apparatus 240 is on the predefined list, then it would be granted an access to the item represented by the virtual object 210. As a further alternative, even if the apparatus 240 had permission to access the item represented by the virtual object 210, it might not have permission to access the item represented by the virtual object 220 for example. It is also possible that the apparatus 240 could have permission to access the item represented by the virtual object 210 for a fixed time period. It is to be noted that these are examples and that any suitable means for restricting access to the item represented by the virtual object 210 or 220 may be used.

Once the apparatus 240 is at a location from which it may access the item represented by the virtual object 210, there may be an indication from apparatus 230 that the item represented by the virtual object 210 is now available. The indication could, for example, be an audio alert, a text prompt on the display of the apparatus 240, haptic feedback on the apparatus 240, a change in the visual appearance of the virtual object 210 or any combination of these indications. Alternatively, any suitable means for indicating can be used to inform the user that the apparatus 240 is at a location from which it may access the item represented by the virtual object 210. For example, if the item represented by the virtual object 210 is password protected, then when the apparatus 240 is located such that its location corresponds to the perceived location of the virtual object 210, there is a prompt for the password on the display of the apparatus 240. The apparatus 230 originates the password prompt and once the user has provided the password via the user interface of the apparatus 240, then the apparatus 240 sends the given password to the apparatus 230. If the password was correct the apparatus 230 provides the access and if the password was incorrect, the access could be denied or another password prompt may be provided. When the password prompt is displayed, at the same time there may be a change in the colour of the virtual object 210. If the password was correct, then the colour and the shape could change again. There could also be an audio alert provided by apparatus 230 to indicate that the password was correct. Alternatively, if the apparatus 240 did not have permission to access the item represented by the virtual object 210 such that the password prompt is not even displayed, then, in an example, there is not any change in the visual appearance of the virtual object 210 nor is there any haptic or audio or any other suitable indication. Another alternative is that even if the item represented by the virtual object 210 is accessible and the apparatus 240 is located either in the tolerance region or at the perceived location of the virtual object 210, no indication regarding the accessibility of the item represented by the virtual object is given. However, it is also possible that even if the item represented by the virtual object 210 is not accessible to the apparatus 240 at all, when the location of the apparatus 240 is proximate the perceived location of the virtual object 210, there is an indication indicating that the apparatus 240 is at the location from which the item represented by the virtual object 210 could be accessed if the apparatus 240 had the right to access it. The indication could be a change in the colour, shape or size of the virtual object 210 or an audio alert or any other suitable means for indicating.

Alternatively, the apparatus 240 may be swiped at the virtual height level in which the virtual object 210 is perceived, or some other recognised gesture may be performed using the apparatus 240. In this context, swiping is done by the user by moving the apparatus 240 continuously such that the perceived location is met at least once during the movement of the apparatus 240. The item represented by the virtual object 210 may then be accessed when the apparatus 240 is swiped across the location at which the virtual object 210 is perceived. As previously discussed, there may be a tolerance region such that if the apparatus 240 swipes over the tolerance region only, the item represented by the virtual object 210 may still be accessed. If the virtual object 210 has a shadow it may be sufficient to swipe over the shadow only to access the item represented by the virtual object 210. Alternatively it is possible to allow access to the item represented by the virtual object 210 only if the perceived location of the virtual object 210 is swiped. Optionally there may be audio alerts provided to indicate when the virtual object 210 is approached. For example, the audio could get louder once the apparatus 240 approaches the perceived location virtual object 210 and the audio may fade as the apparatus 240 moves away from the perceived location of the virtual object 210. There may be indications provided to inform the user that the item represented by the virtual object 210 is accessible. The indications may be of the types that were described earlier. In the example embodiment of FIG. 2B, once the item represented by the virtual object 210 is accessed, the virtual object 210 is then displayed on the display of the apparatus 240. If the virtual object 210 is password protected, then the user is prompted to enter the password as described earlier. In this example, regardless of how the item represented by the virtual object 210 is accessed, once the apparatus 240 has the permission to access the item represented by the virtual object 210, the virtual object 210 is displayed on the display of the apparatus 240.

According to the exemplary embodiment once the apparatus 240, which in this example is a mobile device, overlaps at least partly at least the perceived location of the shadow of the virtual object representing the text file, the tablet device sends a password query to the mobile device. At the same time the colour of the virtual object is turned to grey. The user provides the password using the user interface of the mobile device. The mobile device then transmits the password to the tablet device, which then checks if the password is correct. If the password is correct, access to the text file is granted to the mobile device. Now the virtual object is white again and the text file can be seen on the display of the mobile device. There is also a little audio played to indicate that the password was correct. The text file may now be viewed and edited by the mobile device.

Figure 2C:
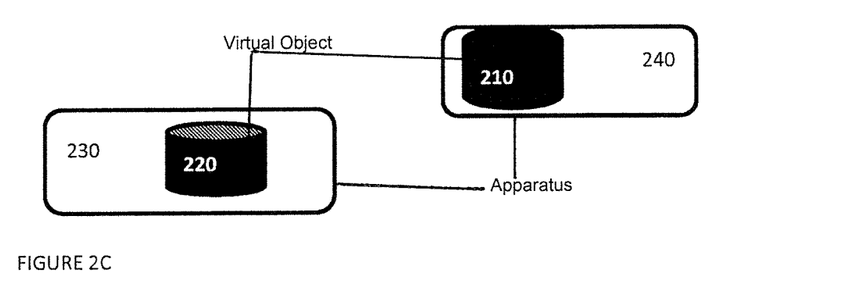

FIG. 2C illustrates the possibility to edit or copy the item represented by the virtual object 210 to the apparatus 240. The copying may be done automatically once the item represented by the virtual object 210 is accessed by the apparatus 240 or when the apparatus 240 is moved away after it has accessed the item represented by the virtual object 210. Alternatively the copying may be triggered by user interaction. This user interaction could be a selection made by the user by pressing a button on the apparatus 240, touching the user interface of the apparatus 240, performing a gesture or any other suitable means for user interaction. Once the copying is made there may optionally be an indication on the apparatus 230, or the apparatus 240, or on both, to the user that the copying has been done. The indication may include means such as a note being displayed, an audio being played, haptic feedback, changes in the visual appearance of the virtual object 210, a combination of any of these indications or any other suitable means for indicating.

After copying, the item represented by the virtual object 210 may exist in apparatus 230 as well. Then the virtual object 210 may optionally have some indication that the item it represents has been copied, like changes in the appearance or any other suitable means for indication. Alternatively, after the item represented by the virtual object 210 has been copied to the apparatus 240, it can be deleted from the apparatus 230. If the item represented by the virtual object 210 is deleted from the apparatus 230, the apparatus 230 may still store information on what the perceived position of the virtual object 210 was when it was accessed by the apparatus 240. The perceived location may then remain empty, in other words, no other virtual object is to be perceived at that location or alternatively, the perceived location may be used for displaying another virtual object. Alternatively, even if the item represented by the virtual object 210 is deleted, the virtual object 210 may still be displayed. In such a case, the appearance of the virtual object 210 may indicate that the item it represents has been deleted.

It should also be noted that the item represented by the virtual object 210 may be edited by the apparatus 240 after the position of the apparatus 240 has changed. Also if the item represented by the virtual object 210 was not deleted from the apparatus 230 after it was copied to the apparatus 240, the item represented by the virtual object 210 may be edited by the apparatus 230 at the same time as it is edited by the apparatus 240. In case there are more items represented by virtual objects than the item represented by the virtual object 210 copied to the apparatus 240, it is possible to combine those items to form a new, single item that is then represented by one of the virtual objects or, alternatively, a new virtual object may be created to represent the new item.

In the example embodiment, the text file is copied to the mobile device. After successfully copying the text file, there is a vibration and an audio alert provided by the mobile device detectable to the user to indicate that the text file was copied. Upon copying the file, the file is deleted from the tablet device but the perceived location of virtual object representing the text file is saved so that the tablet device knows where the virtual object was perceived. After the text file has been copied to the mobile device, the user may wish to go and sit down to read through the text, comment on it and make some corrections. The text file can also be merged with another text file.

Figure 2D:
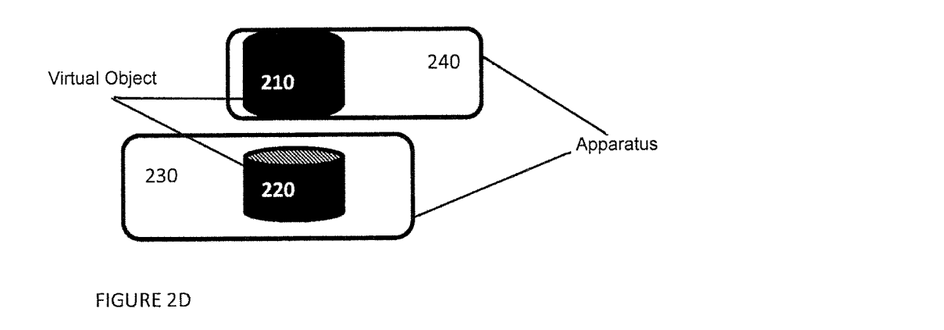

As illustrated in FIG. 2D according to an exemplary embodiment, if the apparatus 240 is subsequently placed at the same proximity where it was when accessing the item represented by the virtual object 210, the apparatus 230 now has access to the item represented by the virtual object 210. Accessing the item represented by the virtual object may be done in the same way as was described above when discussing FIG. 2B. If the apparatus 230 knows the perceived location the virtual object 210 had before the item was copied to the apparatus 240 as was described above, when detecting that the proximity of the apparatus 240 corresponds to the perceived location, the item may be accessed and copied to the apparatus 230. Alternatively, if the apparatus 230 does not know the perceived location the virtual object 210 had when the item was copied to the apparatus 240, or if the item has been combined with at least one other item, or another virtual object is perceived at the same location at which the virtual object 210 was perceived before the item it represents was copied, there may be an indication from the apparatus 240 to the apparatus 230 that there is an item available to be accessed. This indication may be automatic or it may be originated by the user using the user interface of the apparatus 240 or a gesture or any other suitable means. A further alternative is that there may be a designated region to which the item represented by the virtual object 210 can be returned. In other words, when the apparatus 240 is located in that region, the apparatus 230 automatically knows that it is to receive the item represented by the virtual object 210. Still a further alternative is to swipe or perform another recognised gesture over the location in which the virtual object 210 was perceived before the item it represents was copied to the apparatus 240. When this swipe or gesture is made, the item represented by the virtual object 210 is returned to the apparatus 230. Another option could be that the apparatus 240 projects a virtual object representing the item to be returned and the apparatus 230 accesses the item by having the same location as the virtual object. It should be noted that these different methods of returning the item represented by the virtual object 210 are not mutually exclusive but may all be used as alternative ways of returning the item represented by the virtual object 210, and/or combinations of these methods may be used.

In case the item represented by the virtual object was not deleted from apparatus 230 after it was copied to the apparatus 240, the item represented by the virtual object 210 displayed by the apparatus 230 may be replaced by the item represented by the virtual object stored in the apparatus 240. The replacement may be done using any known technique. For example, the user may choose to replace it via the user interface 150. Alternatively, the replacement may be done automatically or the user may be prompted to replace the item represented by the virtual object 210 with the item represented by the virtual object displayed by the apparatus 230. It is also possible to save the edited version of the item represented by the virtual object 210 as a new item, in which case the virtual object 210 displayed by the apparatus 230 is not replaced. In a further example embodiment, if the apparatus 240 has not edited the item represented by the virtual object 210, then the replacement may also be omitted. In a yet further embodiment, the item represented by the virtual object 210 stored in the apparatus 240 is accessed and viewed by the apparatus 230, but it is not copied to the apparatus 230. If the item represented by the virtual object 210 was obtained via a network, such as the World Wide Web, then the item represented by the virtual object 210 may now be returned to the original source via the network.

In the example embodiment the edited text file is returned to the tablet device. The return is initiated by placing the mobile device at the perceived location the virtual object had when the text file was copied. As the tablet device remembers the perceived location of the virtual object and it now detects the mobile device at that location, it automatically accesses the text file. Once the tablet device has accessed the text file, there is an audio indication to inform a user that the text file has been accessed. In this example the tablet device also copies the edited text file and saves it to the memory. The tablet device then displays the virtual object having the appearance of a text file again to be perceived at the same location above the tablet device it was perceived before the text file was accessed.

Figure 2E:
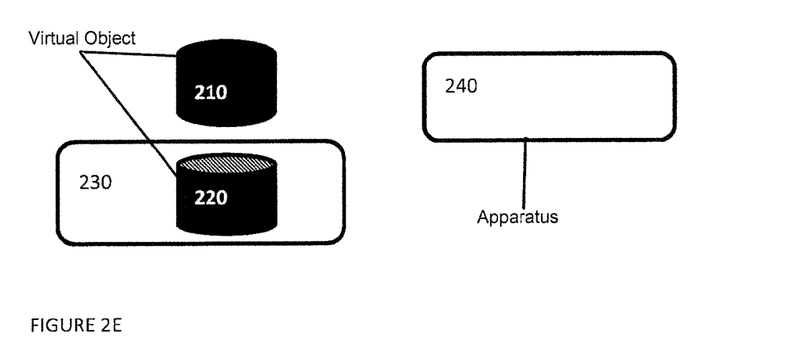

FIG. 2E illustrates the situation in which the item represented by the virtual object 210 has been returned to the apparatus 230. Now the apparatus 240 may be moved away and the virtual object is displayed by the apparatus 230. The item represented by the virtual object 210 has been deleted from the apparatus 240. Alternatively, the item represented by the virtual object does not have to be deleted from the apparatus 240, in which case there is a copy of the item represented by the virtual object 210 in both of the apparatuses 230 and 240.

In the example embodiment, once the text file has been copied to the tablet device, it is deleted from the mobile device.

The following is a description of a further example embodiment, in which a virtual object is a representation of an image file. The image is first obtained via a computer device and then a virtual object representing it is displayed so that it can be perceived by the user at a location that is in front of the computer device. The virtual object has an appearance that corresponds to the image the image file contains. As a mobile device approaches the virtual object, there is an audio that is heard more loudly the closer the mobile device gets to the virtual object. Once the mobile device is at the perceived location of the virtual object, the colours of the virtual object fade and there is a prompt on the user interface of the mobile device asking if the user wishes to access the image file that the virtual object represents. By choosing to access the image file, the mobile device is allowed access to the image file and the image file is copied to the mobile device. Once the copying is performed, there is a small vibration that can be felt when holding the mobile device to indicate that the image file has been copied. Now the user may take the mobile device and walk into another room to look at the image file. While away, the user edits the image file by adjusting the colours and cropping it. After that the user comes back and takes the mobile device to the returning area of the computer device. Once in that area, the user indicates using the user interface of the mobile device that the image file is ready to be returned. This causes an indication to be sent to the computer device and then the computer device copies the image file from the mobile device. As the image file was deleted when it was copied to the mobile device, no replacement is needed. After the computer device has copied the image file, it displays the virtual object representing the image file again at the same perceived location at which the virtual object was displayed before the image file was accessed by the mobile device. The computer device also transmits the edited version of the image file via the network to the place from which it was originally obtained. The image file is now deleted from the mobile device.

In a further example embodiment, a game is provided. In this example the game comprises virtual objects that represent puzzles that the user is to solve. These virtual objects are displayed by a 3D-capable TV that is connected to a gaming device. Each virtual object has its own perceived location and a colour and shape that illustrate the level of difficulty of the puzzle it represents. In the example embodiment, each puzzle can be picked up by a suitable apparatus such as a mobile device by placing the mobile device at the perceived location of the virtual object that represents the puzzle to be picked up. The idea is that there is at least one user and the user picks up a puzzle with his/her mobile device, solves the puzzle and then returns it to the return area. After the puzzle has been returned to the TV connected to the gaming device, the gaming device checks if the result is correct and then gives points accordingly to the user. As each mobile device is unique, each mobile device may be recognized by the gaming device and thus if there is more than one user, each user may be credited individually. Also as the gaming device knows the time when the puzzle was picked up and the time when it was returned, it is possible to count the time it took to solve the puzzle. The time may affect the scoring. Once a puzzle has been picked up, a new virtual object may be displayed at the perceived location from which the puzzle was picked up. The more difficult the puzzle, the more points there are available. In one example, the virtual objects representing easy puzzles may appear as green, virtual objects representing medium ones as yellow and virtual objects representing hard ones as red, so that the user may easily detect which puzzle to pick up. The puzzle may be picked up by swiping or just overlapping the perceived location of the virtual object representing the puzzle. The user takes his/her device away and solves the puzzle and then returns the solved puzzle. There may be sounds provided indicating whether the puzzle was solved correctly or not. The user who gets the highest score is the winner of the game.

A variation to the example embodiment of the puzzle game is that each player is assigned a virtual height level. This way each player has access only to the puzzles that have the respective virtual objects perceivable at the assigned virtual height level. The virtual height level could be assigned to each player in the beginning of the game. In this example embodiment the return area for the solved puzzles are not needed as each player may return the puzzle to the perceived location from which it was picked up. Further, virtual objects at one virtual height level could all share the same colour and the shape of the virtual object could be used to indicate the level of difficulty of the puzzle or vice versa.

In certain embodiments such as the gaming embodiments described above it may be useful to perform a calibration before beginning. The purpose of calibration is to find out at which physical height level a given user perceives the virtual height level. The correspondence between the perceived height level and the physical height level of the virtual height level does not have to be exact, some tolerance may be allowed. Especially, if there are several virtual height levels, the calibration operation may have the advantage of ensuring that each virtual height level is correctly recognized to correspond to the user's perception of that virtual height level. There may be a default setting that for example the first virtual height level corresponds to the physical height level 3 inches above the apparatus displaying the virtual object. An example of how the calibration may be performed is that a virtual object is displayed on the first virtual height level. After that the user is asked to take his/her apparatus to the height at which the virtual object is perceived. Once the user has placed his/her apparatus at the height level that the user perceives as the corresponding height level, the user indicates via the user interface of his/her apparatus, that this is the height level at which the virtual object is perceived. The indication is now transmitted to the projecting apparatus. Upon receiving the indication, the projecting apparatus detects its actual physical distance from the user's apparatus. For example, the detected physical distance could be 2.8 inches. Now the projecting apparatus knows which physical distance corresponds to the virtual height level. If there is more than one virtual height level used, then the calibration can be done separately for each virtual height level.

A further example embodiment involves an apparatus with a display that does not have a 3D capability. Such apparatus may be for example a conventional mobile phone. In this example embodiment there are at least two files stored in the mobile phone and on the display icons representing the files are depicted such that one icon is on top of another icon, which can be achieved by using a graphical representation of overlapping icons for example. If the user now brings another apparatus such that it is located on top of the mobile phone, the file represented by the icon on top of the other icon may be accessed. The accessing begins by the mobile phone detecting that there is another apparatus above it. The file represented by the icon above the other one is now made accessible and the accessibility is indicated by an audio alert. Similarly, if the other apparatus is detected behind the mobile phone, the file represented by the icon below the other icon may be accessed. In this example, in general when the location of the other apparatus has a correspondence to the perceived location of the icon representing the file, the file may be accessed. The accessing is done using wireless radio connectivity such as Bluetooth. In the example, once the file is accessed, it is copied to the accessing apparatus and deleted from the mobile phone. After this, once the other apparatus is detected at the location from which the file was copied, the Bluetooth connection is established again and the file is now copied to the mobile phone.

Figure 3:
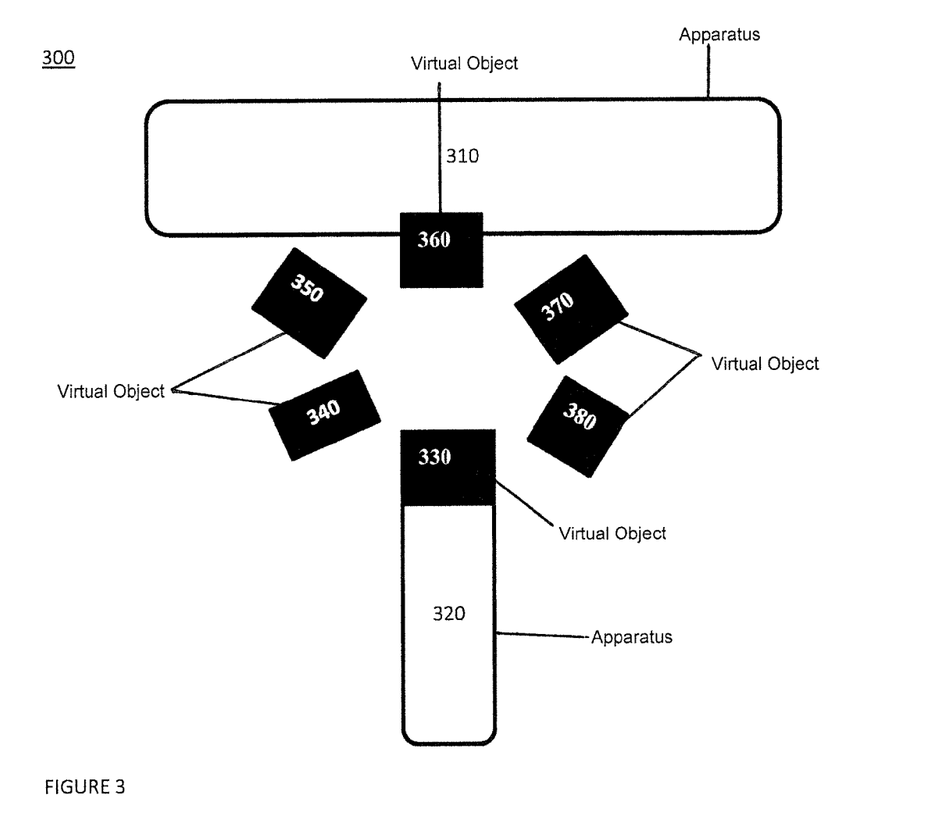
FIG. 3 illustrates an exemplary embodiment incorporating aspects of the disclosed embodiments.

Multiple different use scenarios are discussed next in the context of the items depicted in FIG. 3. FIG. 3 illustrates an example embodiment, in which an apparatus 310 displaying virtual objects 330-380 is placed in such a way that the distance between the apparatus 310 and the apparatus 320 is constant. The apparatus 310 displays the virtual objects 330-380 using a 3D display technique. An option that is depicted in FIG. 3 is to display the virtual objects 330-380 using a 3D carousel. The virtual objects 330-380 may be alike to the virtual objects 210 and 220 depicted earlier. The apparatus 310 and 320 may be apparatuses according to the apparatus described in FIG. 1. The carousel may have discrete virtual height levels alike to the virtual height levels that were described earlier. Another option is to use a continuous carousel without discrete virtual height levels.

In this example, the apparatus 320 accesses the item represented by the closest virtual object, which is the virtual object 330. Accessing the item represented by the virtual object 330 may be done automatically or it may be initiated by the user of the apparatus 320 by for example shaking the apparatus 320. The item represented by the virtual object may be accessible to all apparatuses or it may be password protected or the accesses may be limited to certain apparatuses. When the item represented by the virtual object 330 is accessed, it can be viewed and/or edited by the apparatus 320. While viewing, the user of apparatus 320 may also rotate the carousel of virtual objects so that even though the apparatus 320 is not moved, the item accessed changes from the item represented by the virtual object 330 to the item represented by the virtual object 380. This rotation may be done using the user interface of the apparatus 320, for example by flicking on the screen of the apparatus 320 or by tilting the apparatus 320. It may also be possible that the user interacts directly with the virtual objects. For example, the user may flick at the perceived location of the closest virtual object, which is in this case the virtual object 330. Upon detecting the flicking, the apparatus 310 rotates the virtual objects 330-380 in the 3D carousel. Alternatively the rotating of the carousel may be automatic. If the rotating of the carousel is automatic, the user may choose to watch the rotating carousel of virtual objects until the desired virtual object is at the position perceived as being closest to the user. At this time the user places the apparatus 320 such that its location equals the perceived location of the virtual object representing the item to be accessed, and the access is then granted. Alternatively any other suitable means may be applied for rotating the carousel of virtual objects.

Once the user has accessed in the carousel the item the user wishes to pick up, the copying of the item to the apparatus 320 may be initiated by the user of the apparatus 320 via the user interface of the apparatus 320.

Once the item represented by the virtual object has been picked up, the perceived virtual location of the virtual object may be left empty or another virtual object may replace it. If the item represented by the virtual object is picked up and edited by the apparatus 320, the object may be returned by placing the apparatus 320 again at the perceived location the virtual object had when the item was picked up. As the apparatus 310 detects that the apparatus 320 is at the position the virtual object had when the item was picked up, it may automatically access the item and copy it. After the copying, the item may be deleted from the apparatus 320.

In a further example embodiment, described in the context of the components illustrated in FIG. 3, the virtual objects depicted represent music items available in an online music store. The contents of the music store are displayed by the apparatus 310, which in this example embodiment is a TV screen connected to a gaming device, as virtual objects 330-380, which each represent a music file retrievable via a network. The music files may be browsed by the apparatus 320, which in this example corresponds to a mobile device, by for example tilting the mobile device. Once the user is interested in a certain music file he may select the item by pressing a select button displayed on the screen of the mobile device and the music file is accessed. There may also be an option for listening to part of the file and if the user likes it, then the user may get access to the complete music file by providing billing details. If the user decides to buy the item, then the necessary payment information may be transmitted to the music store by the gaming device once the gaming device receives the billing information from the mobile device. The payment may be done using any known method of remote payment. Once the payment has been transmitted, the music file can be copied to the mobile device.

In another example embodiment, the items depicted in FIG. 3. represent an online voting system. The apparatus 310 retrieves items that can be voted for from a network and the virtual objects 330-380 are representations of the retrieved items. The user may browse the items. Using FIG. 3 as a reference, the virtual object 330 is a representation of the item that the user votes for and thus the item represented by the virtual object 330 has been selected. The selection may be done in a way that has been discussed above. By accessing the selected item and editing it to include information that it has been voted for by the user, the voting information may be transmitted to the online voting system. Once the item has been edited, either the apparatus 310 may transmit that information to the online voting system or the item represented by the virtual object 330 may include program code needed for transmitting the information to the online voting system. The transmission may be done over a network using any suitable means for transmitting information.

Figure 4:
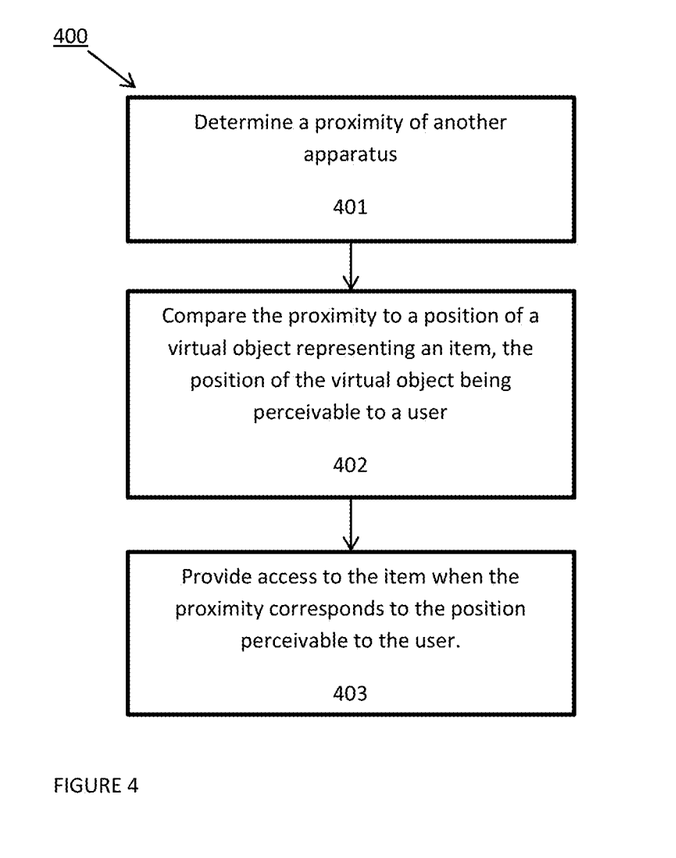
FIG. 4 is a flowchart according to an exemplary method comprising providing access to a virtual object.

FIG. 4 illustrates an exemplary process 400 incorporating aspects of the disclosed embodiments. In a first aspect 401 proximity of an apparatus is determined. After the determination the proximity is compared 402 to the position of a virtual object representing an item, the virtual object having a position perceivable to a user. In a third aspect 403, the item represented by the virtual object is made accessible when the proximity corresponds to the position perceivable to the user.

Figure 5:
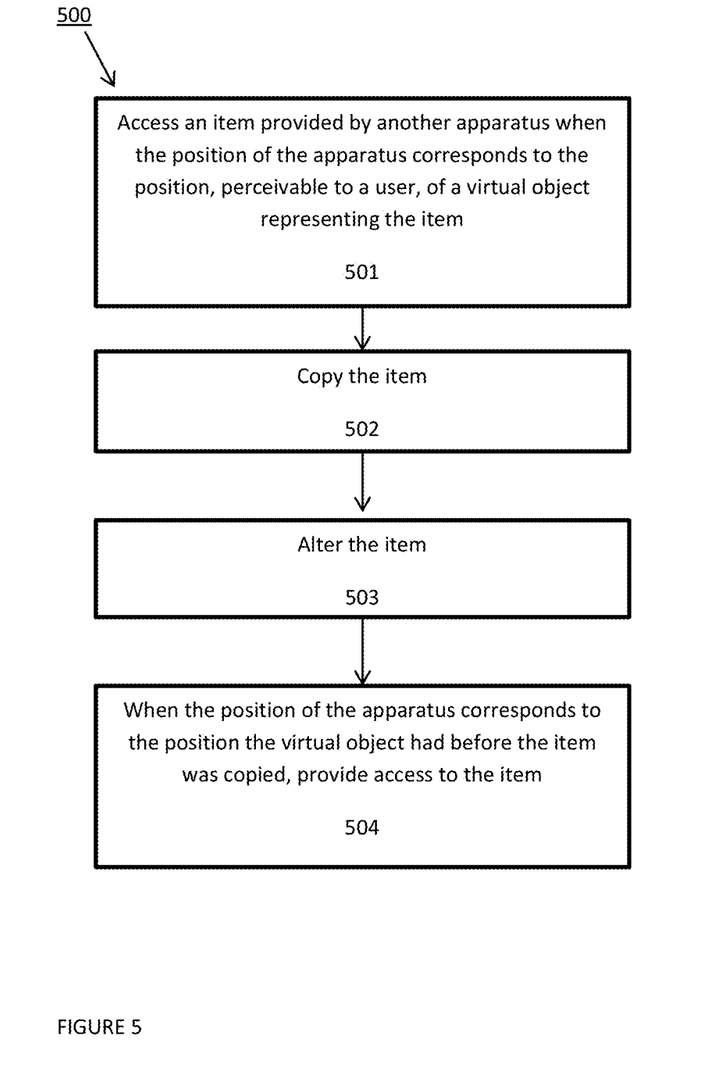
FIG. 5 is a flowchart according to an exemplary method comprising copying an accessed virtual object.

FIG. 5 illustrates another exemplary process 500 incorporating aspects of the disclosed embodiments. In a first aspect 501, a virtual object representing an item is displayed by an apparatus. The item is accessed when the position of the apparatus corresponds to the position perceivable to a user of the virtual object. In a second aspect 502 the virtual object is copied. In a third aspect 503 the item is altered. In a fourth aspect 504, when the position of the apparatus corresponds to the position the virtual object had before the item was copied, access to the item is provided.

Figure 6:
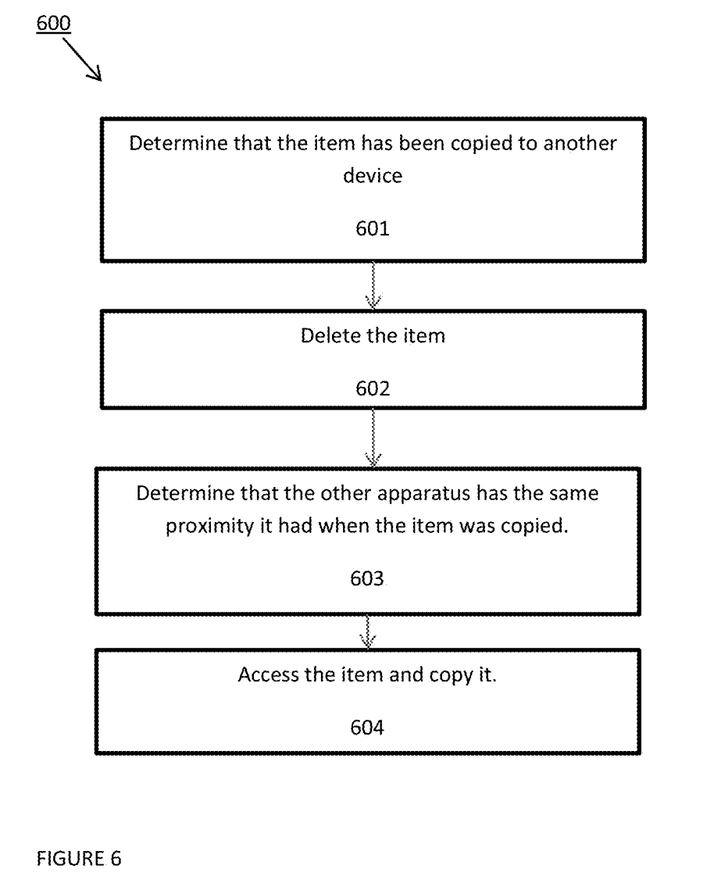
FIG. 6 is a flowchart according to an exemplary method comprising deleting a virtual object that was copied.

FIG. 6 illustrates another exemplary process 600 incorporating aspects of the disclosed embodiments. In a first aspect 601 it is determined that an item represented by a virtual object has been copied to an apparatus. In a second aspect 602 the item is deleted. In a third aspect 603, it is determined that the apparatus has the same proximity it had when the item was copied. In a fourth aspect 604 the item is accessed and copied.

In embodiments of the present invention, a proximity of an apparatus may correspond to a position of a virtual object for example when the apparatus fully or partially occupies a region or a specific point in space at which the virtual object is presented. Correspondence of proximity of an apparatus to position of a virtual object may encompass differing extents of precision. In some example embodiments, thresholds of nearness may be configured, to define when a proximity of an apparatus corresponds to a position of a virtual object. Such thresholds may be configured dynamically, they may be fixed, or they may be variable according to a type of apparatus, a type of virtual object, or other criteria. In some embodiments a specific part of an apparatus may be required to reach a specific proximity to a virtual object in order for the virtual object to be accessible. In alternative embodiments, any part of an apparatus may be positioned near the virtual object in order for the required correspondence of proximity to occur.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising at least one processor and at least one memory including computer program code, the at least one memory and the computer program code configured to, with the at least one processor, cause the apparatus at least to:
   prior to making an item accessible to another apparatus, cause information indicating a position of a virtual object to be provided to a user of the another apparatus via at least one user interface, wherein the virtual object represents the item;
   determine a location of the other apparatus; and
   when the determined location of the other apparatus is within a threshold distance of the position of the virtual object, make the item accessible to the other apparatus.

2. An apparatus according to claim 1, wherein determining the location of the other apparatus comprises determining a physical distance between the apparatuses.

3. An apparatus according to claim 1, wherein the apparatus is further caused to: provide one or more further virtual objects, each having a position perceivable to the user and each representing a further item, the one or more further items being accessible to the other apparatus when the said determined proximity corresponds to the respective position perceivable to the user.

4. The apparatus of claim 1, wherein the information indicating the position of the virtual object indicates the position of the virtual object relative to the apparatus.

5. The apparatus of claim 1, wherein the information indicating the position of the virtual object representing the item is provided to the user via a user interface of the apparatus.

6. The apparatus of claim 1, wherein the information indicating the position of the virtual object representing the item is provided to the user via a user interface of the other apparatus.

7. An apparatus comprising at least one processor and at least one memory including computer program code, the at least one memory and the computer program code configured to, with the at least one processor, cause the apparatus at least to
access an item represented by a virtual object provided by another apparatus when a position of the apparatus corresponds to a position of the virtual object, wherein the position of the virtual object is perceivable to a user of the apparatus at least prior to the accessing of the item.

8. An apparatus according to claim 7 wherein the apparatus is further caused to perform at least one of the following:
copy the item to the apparatus, read the item, read the item while it is still editable by the said other apparatus, edit the item, edit the item while it is still editable by the said other apparatus.

9. An apparatus according to claim 8, wherein the apparatus is further caused to:
after copying the item, make the item accessible to the said other apparatus when a position of the apparatus corresponds to the said position of the virtual object.

10. An apparatus according to claim 7, wherein the apparatus is further caused to:
detect the position of the apparatus relative to the said other apparatus and send information comprising the detected position to the said other apparatus.

11. A method comprising:
prior to making an item stored on an apparatus accessible to a user of another apparatus, causing information indicating a position of a virtual object representing the item stored on the apparatus to be provided to the user via at least one user interface;
determining a location of the another apparatus; and
when the determined location of the another apparatus is within a threshold distance of the position of the virtual object, making the item accessible to the other apparatus.

12. A method according to claim 11, wherein determining the location of the another apparatus comprises determining a physical distance between the apparatuses.

13. A method according to claim 12, wherein the method further comprises: displaying the virtual object using a three dimensional display technique.

14. A method according to claim 13, further comprising:
providing one or more further virtual objects, each having a further position perceivable to the user and each representing a further item, making the one or more further items accessible to the other apparatus when the said determined proximity corresponds to the respective further position perceivable to the user.

15. A method comprising:
accessing, by an apparatus, an item provided by another apparatus and represented by a virtual object when a position of the said apparatus corresponds to a position of the virtual object, wherein the position of the virtual object is perceivable to a user of the apparatus at least prior to the accessing of the item.

16. A method according to claim 15 wherein the method further comprises at least one of the following:
copying the item to the apparatus, reading the item, reading the item while it is still editable by the said other apparatus, editing the item, editing the item while it is still editable by the said other apparatus.

17. A computer program product comprising a non-transitory computer-readable medium bearing computer program code embodied therein for use with a computer, the computer program code comprising:
code for prior to making an item accessible to another apparatus, causing information indicating a position of a virtual object representing an item to be provided to a user of the another apparatus via at least one user interface;
code for determining a location of the other apparatus; and,
code for, when the determined location of the other apparatus is within a threshold distance of the position of the virtual object, making the item accessible to the other apparatus.

18. The computer program product of claim 17, wherein the code for determining the location of the another apparatus comprises code for determining the physical distance between the apparatuses.

19. A computer product comprising a non-transitory computer-readable medium bearing computer program code embodied therein for use with a computer, the computer program code comprising:
code for accessing, by an apparatus, an item provided by another apparatus and represented by a virtual object when a position of the said apparatus corresponds to a position of the virtual object, wherein the position of the virtual object is perceivable to a user of the apparatus at least prior to the accessing of the item.

20. A computer program product of claim 19, further comprising at least one of the following: code for copying the item to the apparatus, code for reading the item, code for reading the item while it is still editable by the said other apparatus, code for editing the item, code for editing the item while it is still editable by the said other apparatus.

* * * * *